United States Patent
Lee et al.

(10) Patent No.: US 7,175,301 B2
(45) Date of Patent: Feb. 13, 2007

(54) BACKLIGHT MODULE AND A DISPLAY DEVICE UTILIZING THE SAME

(75) Inventors: Kuo-Chih Lee, Sinhua Township, Tainan County (TW); Ming-Fa Wang, Jhunan Township, Miaoli County (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/379,811

(22) Filed: Apr. 24, 2006

(65) Prior Publication Data

US 2006/0187674 A1 Aug. 24, 2006

Related U.S. Application Data

(63) Continuation of application No. 10/783,926, filed on Feb. 20, 2004, now Pat. No. 7,083,301.

(51) Int. Cl.
*F21S 4/00* (2006.01)

(52) U.S. Cl. ..................... 362/225; 362/249

(58) Field of Classification Search ........ 362/224–225, 362/362, 375, 561, 260, 217, 219, 222–223, 362/613–614; 349/58, 60, 70; 439/226–244
See application file for complete search history.

(56) References Cited

U.S. PATENT DOCUMENTS

| | | | |
|---|---|---|---|
| 4,540,876 A | 9/1985 | McGinty | 219/405 |
| 6,796,678 B2 | 9/2004 | Moon | 362/225 |
| 6,857,759 B2 | 2/2005 | Lee et al. | 362/225 |
| 6,880,953 B2 | 4/2005 | Shin | 362/225 |
| 2003/0086255 A1 | 5/2003 | Moon et al. | 362/97 |

*Primary Examiner*—Renee Luebke
*Assistant Examiner*—Robert May
(74) *Attorney, Agent, or Firm*—Thomas, Kayden, Horstemeyer & Risley

(57) ABSTRACT

A backlight module. The backlight module comprises first to fourth fixed seats, first and second conductive devices, and lamps. The first and second fixed seats have grooves. The first and second conductive devices have V-shaped scallops electrically connected with one another. Each V-shaped scallop is disposed in a corresponding groove. The lamps are disposed parallel to one another, each having a first and second ends respectively disposed in the grooves of the third and fourth fixed seats, for fixing the lamps. Depth and area of each V-shaped scallop both exceed a diameter of the lamp. A liquid crystal display device utilizing the backlight module is also disclosed.

10 Claims, 5 Drawing Sheets

BACKLIGHT MODULE AND A DISPLAY DEVICE UTILIZING THE SAME

CROSS-REFERENCE TO RELATED APPLICATION

This application is a continuation of U.S. patent application Ser. No. 10/783,926, filed Feb. 20, 2004 now U.S. Pat. No. 7,083,301.

BACKGROUND OF THE INVENTION

1. Field of the Invention

The present invention relates to a backlight module, and more particularly to a backlight module applied in a liquid crystal display device.

2. Description of the Related Art

US publication number 2003/0086255 discloses a backlight module. A structure of the backlight module is shown in FIG. 1, wherein backlight module 10 comprises lamps 11, 12, ..., and 1n and fixed seats 12a, 12b, 12c, and 12d. The backlight module 10 utilizes the fixed seats 12a, 12b, 12c, and 12d to fix the lamps 11, 12, ..., and In. The structures of the fixed seats 12a, 12b, 12c, and 12d are the same.

FIG. 2 is an exploded view of the conventional backlight module. Because the structures of the fixed seats 12a, 12b, 12c, and 12d are the same, only the fixed seat 12c is described herein as an example. The fixed seat 12c has grooves 181, 182, 183, and 184 receiving the fixed devices 161c, 162c, 163c, and 164c having semicircular grooves. Conductive device 14c is disposed on the fixed devices 161c, 162c, 163c, and 164c. The conductive device 14c has semicircular scallops for fixing the lamps on the conductive device 14c. Finally, the fixed seat 12d covers the lamps.

While the conductive device 14c must comprise semicircular scallops corresponding to the shape of the lamps, the shaping of the scallops is difficult to control during manufacture. When conductive device 14c is improperly shaped, backlight function suffers.

Fixed seat 12d may not fully cover the lamps, due to the semicircular scallops being too shallow, such that only a part of each lamp is contained in the semicircular scallop with the remainder extending beyond the port. This allows accidental contact with foreign objects, at which time the lamps can easily dislodge from the semicircular scallops.

SUMMARY OF THE INVENTION

An object of the present invention is to provide a backlight module, providing complete containment of lamps, thus avoiding damage to the lamps.

Accordingly, the present invention provides a first fixed seat, a second fixed seat, a first conductive device, a second conductive device, a plurality of lamps, a third fixed seat, and a fourth fixed seat. The first fixed seat has a plurality of grooves. The second fixed seat also has a plurality of grooves. The first conductive device has a plurality of V-shaped scallops electrically connected each disposed in the groove of the first fixed seat. The second conductive device has a plurality of V-shaped scallops electrically connected, each disposed in the corresponding groove of the second fixed seat. The lamps are parallel to one another, each having a first end and a second end, wherein each first end is disposed in the V-shaped scallop of the first conductive device and each second end is disposed in the V-shaped scallop of the second conductive device. The third fixed seat is disposed on the first end for fixing the lamps. The fourth fixed seat is disposed on the second end for fixing the lamps. Depth and area of each V-shaped scallop both exceed a diameter of the lamp. Therefore, the V-shaped scallops completely contain the lamps. When contacting external objects, the lamps are not dislodged form the first or the second fixed seat.

Based on the structure of the backlight module disclosed another object of the present invention is to provide a liquid crystal display device. Manufacturing yield of the device is improved when compared with that of conventional LCD devices. The liquid crystal display device of the present invention comprises a display panel and a backlight module disposed on the back thereof, supplying light to the display panel. The backlight module comprises a first fixed seat, a second fixed seat, a first conductive device, a second conductive device, a plurality of lamps, a third fixed seat, and a fourth fixed seat. The first fixed seat has a plurality of grooves. The second fixed seat also has a plurality of grooves. The first conductive device has a plurality of V-shaped scallops electrically connected each disposed in the corresponding groove of the first fixed seat. The second conductive device has a plurality of V-shaped scallops electrically connected each disposed in the corresponding groove of the second fixed seat. The lamps are parallel to one another, each having a first end and a second end, wherein each first end is disposed in the V-shaped scallop of the first conductive device and each end is disposed in the V-shaped scallop of the second conductive device. The third fixed seat is disposed on the first end for fixing the lamps. The fourth fixed seat is disposed on the second end for fixing the lamps. Depth and area of each V-shaped scallop both exceed a diameter of the lamp. Dimensions of the V-shaped scallops are easily controlled during manufacture, thus increasing the yield of the backlight module and the liquid crystal display device.

BRIEF DESCRIPTION OF THE DRAWINGS

The present invention can be more fully understood by reading the subsequent detailed description and examples with reference made to the accompanying drawings, wherein.

DETAILED DESCRIPTION OF THE INVENTION

Figure 1:
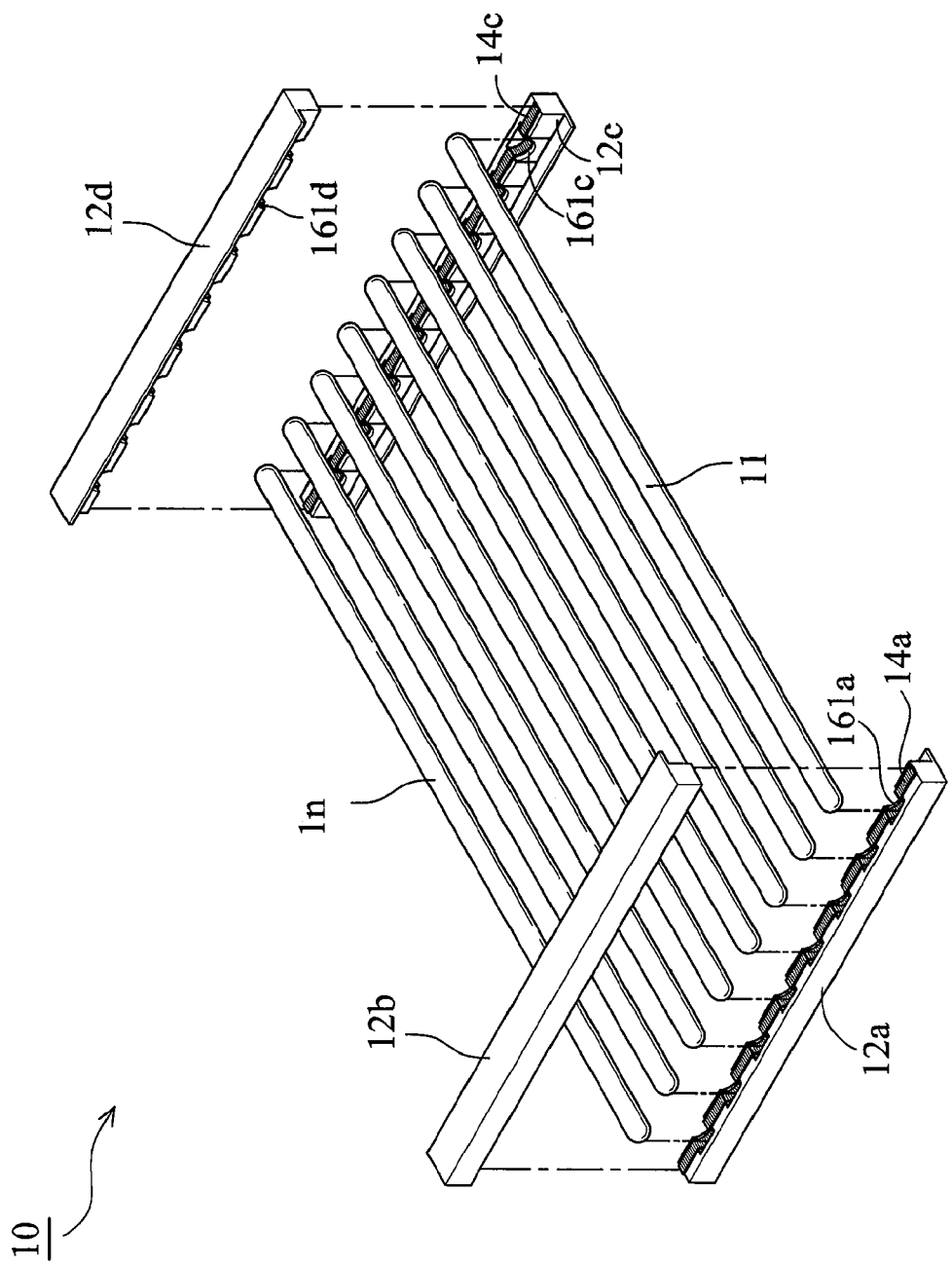
FIG. 1 shows a structure of a conventional backlight module.
Figure 2:
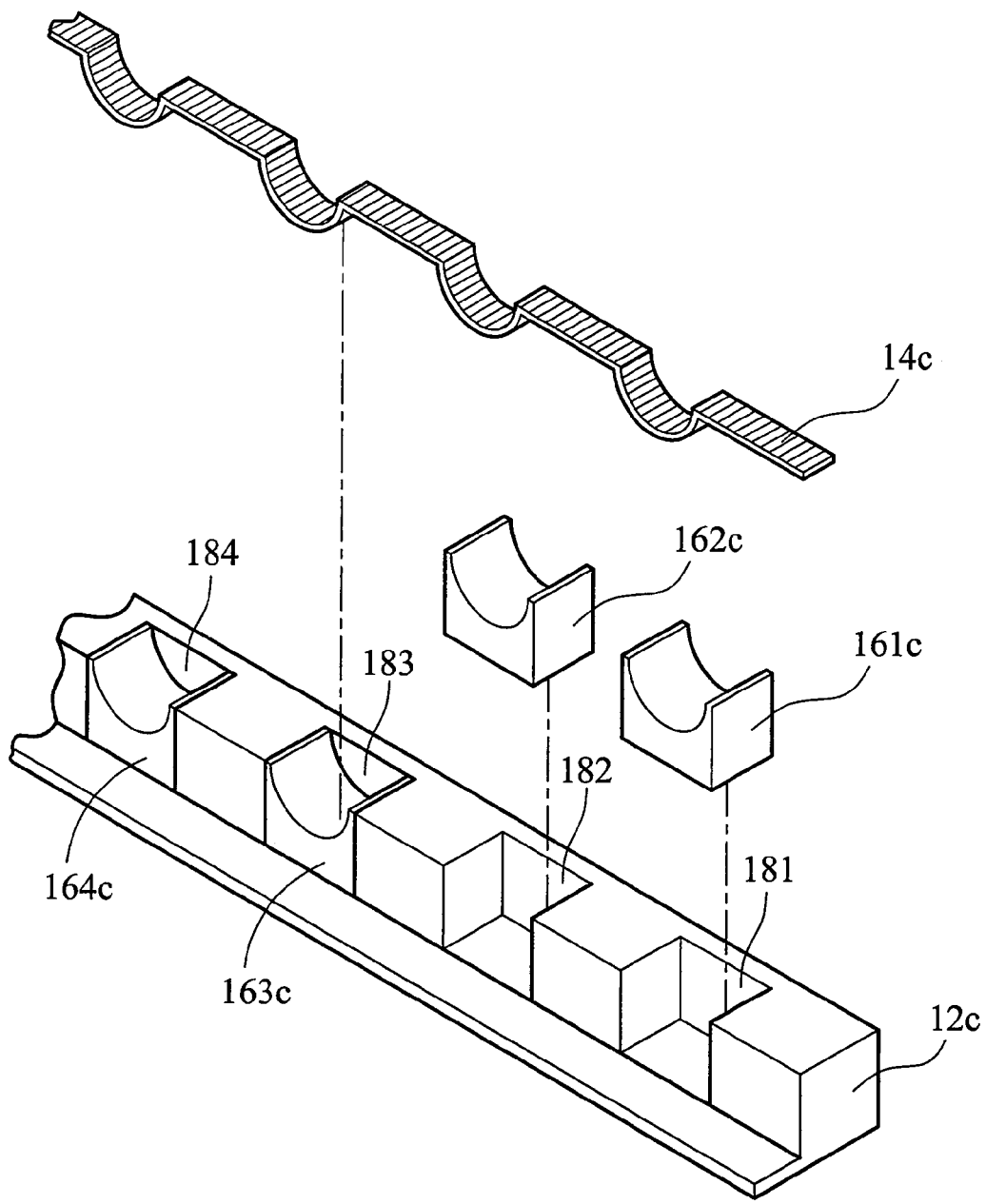
FIG. 2 is an exploded view of the conventional backlight module.
Figure 3:
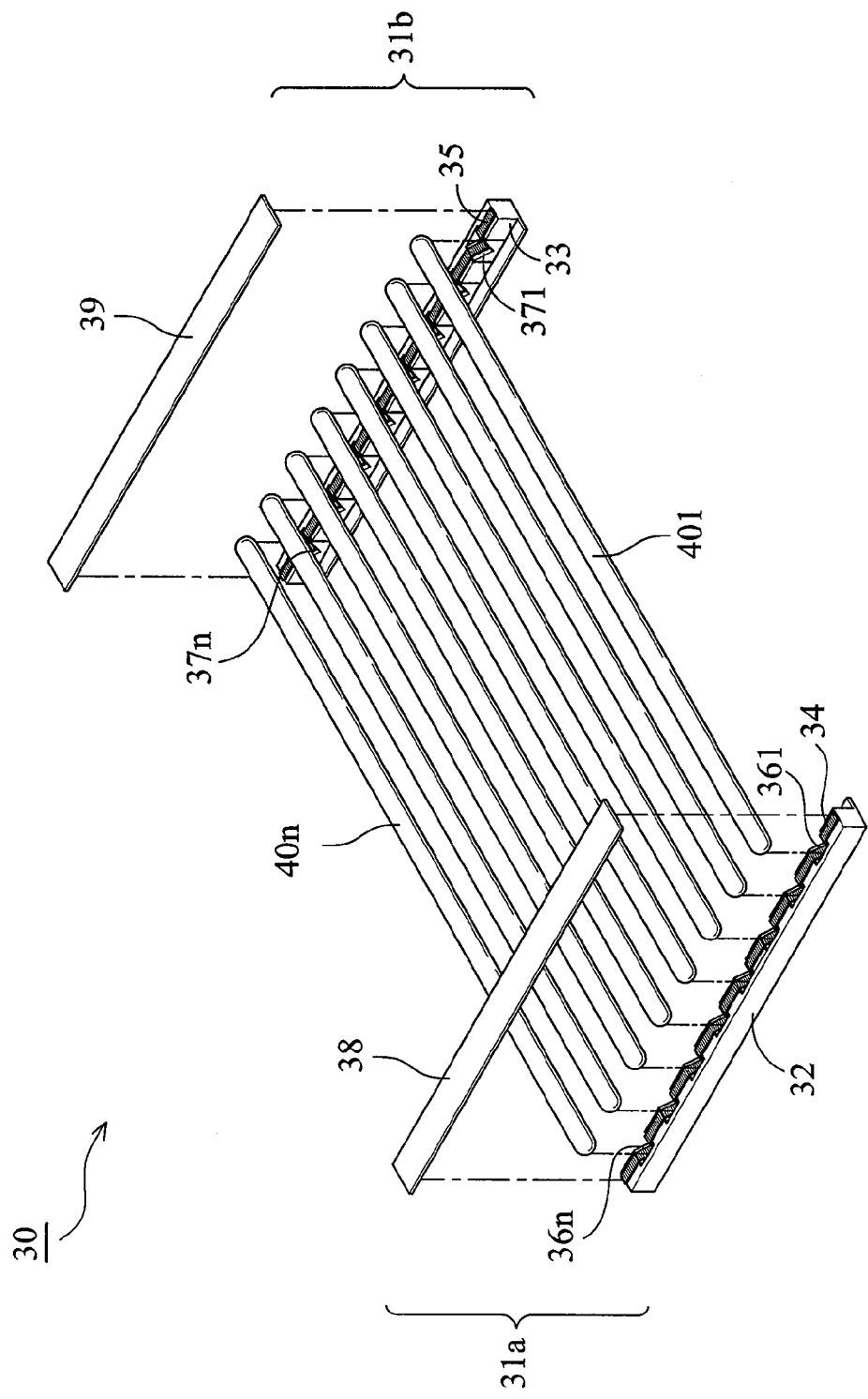
FIG. 3 shows a structure of a backlight module of the present invention.

FIG. 3 shows a structure of a backlight module of the present invention. The backlight module 30 comprises a left fixed rack 31a, a right fixed rack 31b, and lamps 401, 402, ..., 40n. The left fixed rack 31a fixes the left ends of the lamps 401, 402, ..., 40n. The right fixed rack 31b fixes the right ends of the lamps 401, 402, ..., 40n. The left fixed rack 31a has a lower fixed seat 32, fixed devices 361, 362, ..., 36n, a conductive device 34, and a lower fixed seat 38. The right fixed rack 31b has a lower fixed seat 33, fixed devices 371, 372, ..., 37n, a conductive device 35, and an upper fixed seat 39.

Figure 4:
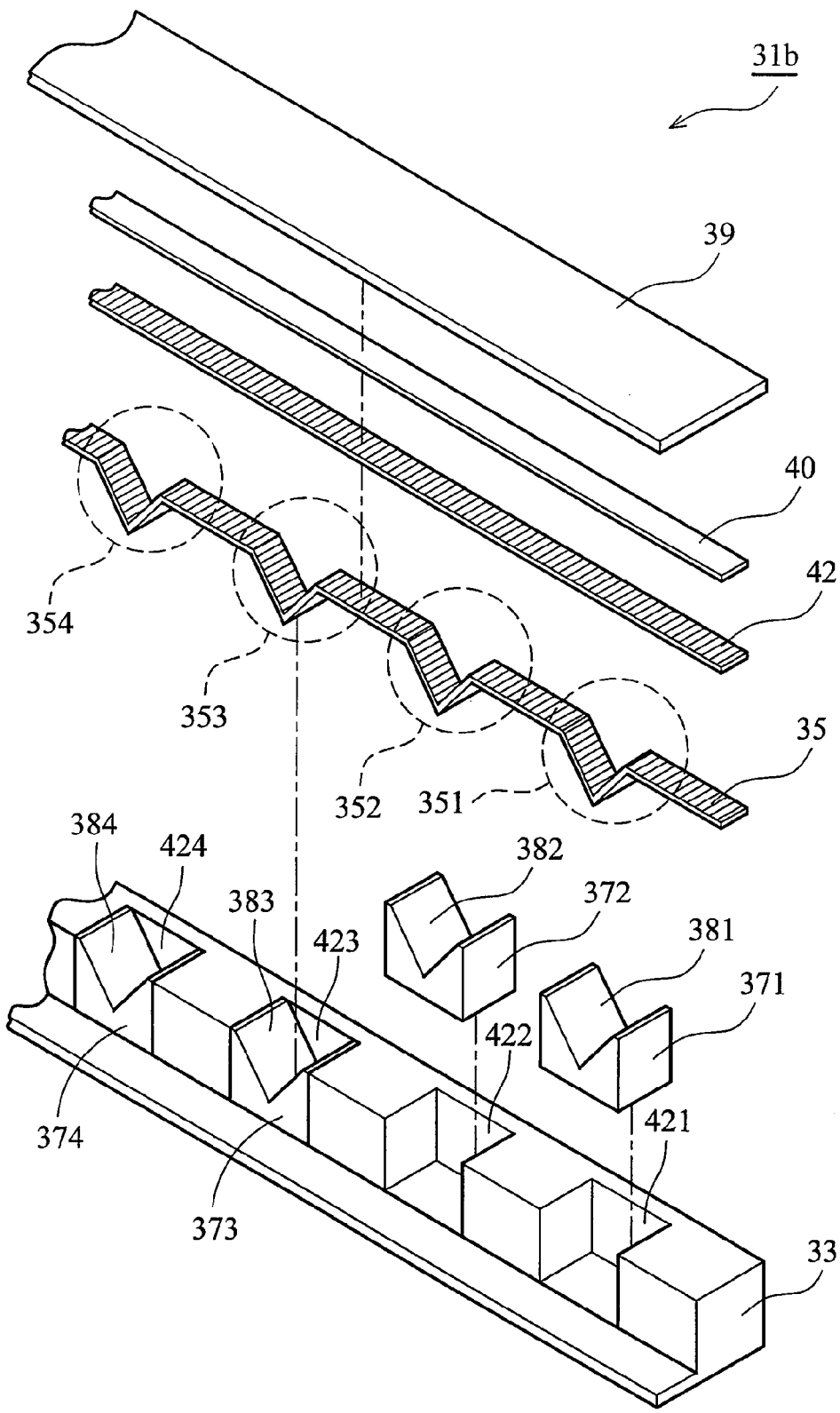
FIG. 4 is an exploded view of the fixed rack of the present invention.

FIG. 4 is an exploded view of the fixed rack of the present invention. Because structures of the fixed rack 31a and 31b are the same, only the fixed rack 31b is described herein as an example. The lower fixed seat 33 has grooves for seating the lamps. The number of grooves equals the number of lamps. FIG. 4 only shows four grooves 421, 422, 423, and 424 for brevity.

Fixed devices 371, 372, 373, and 374 are disposed in the grooves 421, 422, 423, and 424. The material of the fixed device 371, 372, 373, and 374 is resilient to avoid direct contact between the lamps and the lower fixed seat 33. The fixed device 371, 372, 373, and 374 can be omitted herein. Each fixed device 371, 372, 373, and 374 has a corresponding V-shaped internal scallop 381, 382, 383, and 384.

When the conductive device 35 is disposed on the fixed device 371, 372, 373, and 374, each V-shaped scallop 351, 352, 353, and 354 conforms directly to each V-shaped internal side 381, 382, 383, and 384. One end of the lamps 401, 402, 403, and 404 is disposed in the V-shaped scallop 351, 352, 353, and 354 of the conductive device 35. Because the V-shaped scallops 351, 352, 353, and 354 are electrically connected, the ends of the lamps 401, 402, 403, and 404 are also electrically connected with one another.

A conductive device 42 is disposed on the lamps 401, 402, 403, and 404, for increasing electrical connection with the lamps 401, 402, 403, and 404. An isolation layer 40 is disposed on the conductive device 42 and then the upper fixed seat 39 is disposed on the isolation layer 40. The conductive device 42 can be omitted herein. If the conductive device 42 is omitted, the isolation layer 40 is disposed on the lamps 401, 402, 403, and 404. Finally, the upper fixed seat 39 is disposed on the isolation layer 40. The isolation layer 40 is soft, so as to avoid direct contact of the lamps with the upper fixed seat 39.

Figure 5:
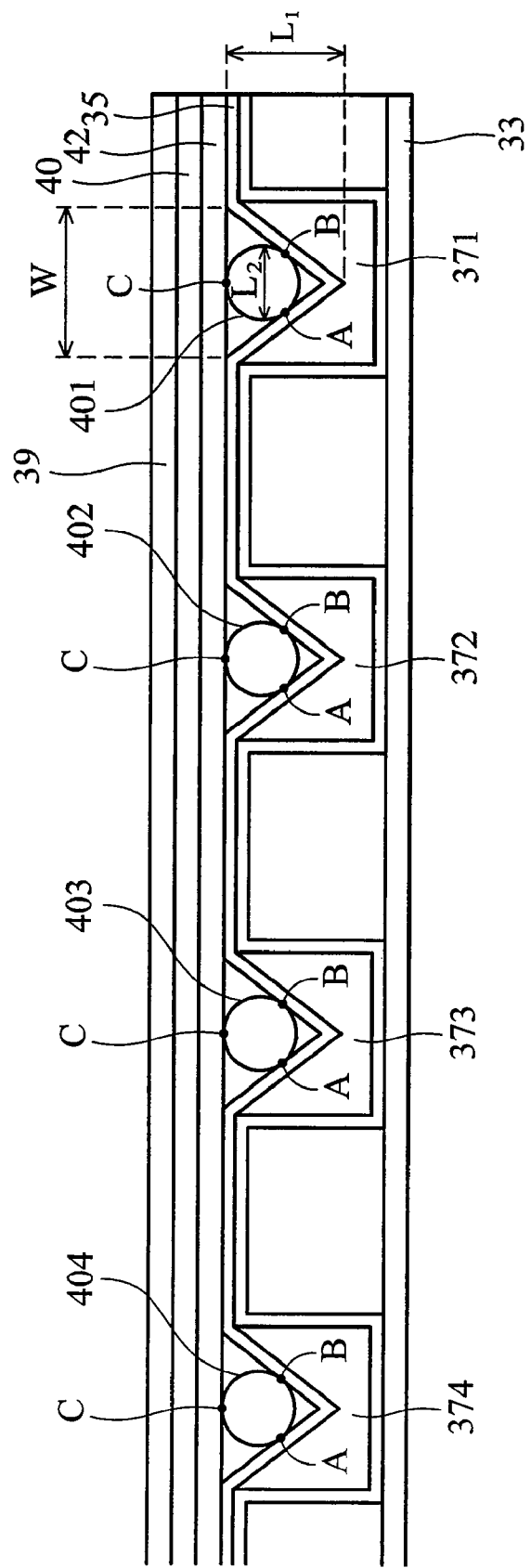
FIG. 5 shows a section of the fixed rack of the present invention.

FIG. 5 shows a section of the fixed rack of the present invention. Each fixed device 371, 372, 373, and 374 has a V-shaped internal scallop and is disposed on the lower fixed seat 33. The conductive device 35 is disposed on the fixed devices 371, 372, 373, and 374. Each V-shaped scallop of the conductive device 35 conforms directly to each V-shaped internal side of the fixed device 371, 372, 373, and 374. Each lamp 401, 402, 403, and 404 is disposed in each V-shaped scallop of the conductive device 35.

A conductive device 42 is disposed on the lamps 401, 402, 403, and 404 for increasing electrical connection with the lamps 401, 402, 403, and 404. The isolation layer 40 is disposed on the conductive device 42. Finally, the upper fixed seat 39 covers the conductive device 42. To completely contain the lamps 401, 402, 403, and 404 in the V-shaped scallop of the conductive device 35, a depth $L_1$ and an opening W of the V-shaped scallop of the conductive device 35 must both exceed a diameter $L_2$ of the lamps 401, 402, 403, and 404.

The lamps 401, 402, 403, and 404 are fixed by the V-shaped scallop. This allows accidental contact with foreign objects, at which time the lamps 401, 402, 403, and 404 will not dislodge from the V-shaped scallop. Shaping of the scallop is easily to control during manufacture, thus increased the yield of the backlight module. Because the V-shaped scallops can completely contain the lamps 401, 402, 403, and 404, the upper fixed seat 39 and the conductive device 42 do not require any groove, thus decreasing costs.

If the conductive device 42 is omitted, the electrical connection points of the lamps 401, 402, 403, and 404 are points A and B. If the conductive device 42 is not omitted, the electrical connection points of the lamps 401, 402, 403, and 404 are point A, B, and C. The backlight module of the present invention is applied to a liquid crystal display. The conductive device 42 and upper fixed seat 39 do not require grooves, thus avoiding errors during formation.

The dimension of the V-shaped scallops of the conductive device is easily controlled during manufacture, increasing yield of the backlight module. As well, the conductive device with the V-shaped scallops and the upper fixed seat does not cover the lamps, such that lamps disposed in the V-shaped scallops will not dislodge from the V-shaped scallops when contacting external objects. Finally, the upper fixed seat does not require grooves, thus decreasing the cost of manufacture.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module, comprising:
   a first fixed seat having a plurality of grooves;
   a second fixed seat having a plurality of grooves;
   a first conductive device having a plurality of V-shaped scallops electrically connected each disposed in a corresponding groove of the first fixed seat;
   a second conductive device having a plurality of V-shaped scallops electrically connected each disposed in a corresponding groove of the second fixed seat;
   a plurality of lamps, disposed parallel to one another, each having a first end and a second end, wherein each first end is disposed in the corresponding V-shaped scallop of the first conductive device and each second end is disposed in the corresponding V-shaped scallop of the second conductive device;
   a third fixed seat disposed on the first end for fixing the lamps; and
   a fourth fixed seat disposed on the second end for fixing the lamps; wherein the surfaces of the third and fourth fixed seats are flat so that the lamps are fixed by triangle spaces formed by the V-shaped scallops and the flat surfaces of the third and fourth fixed seats.

2. The backlight module as claimed in claim 1, wherein depth and area of each V-shaped scallop both exceed a diameter of the lamp.

3. The backlight module as claimed in claim 1, further comprises:
   a first isolation layer, disposed between the first end of the lamp and the third fixed seat; and
   a second isolation layer, disposed between the second end of the lamp and the fourth fixed seat.

4. The backlight module as claimed in claim 3, further comprising:
   a third conductive device, disposed between the first isolation layer and the first end of the lamp; and
   a fourth conductive device, disposed between the second isolation layer and the second end of the lamp.

5. The backlight module as claimed in claim 1 further comprising a plurality of fixed devices, each having a V-shaped internal side and disposed between the groove of the first fixed seat and the V-shaped scallops of the first conductive device and disposed between the grooves of the second fixed seat and the V-shaped scallops of the second conductive device, wherein each of the V-shaped scallops of the first and the second conductive devices conforms directly to each V-shaped internal side of the fixed device.

6. A liquid crystal display device, comprising at least:
   a display panel; and
   a backlight module, disposed at the rear of the display panel, supplying light to the display panel, comprising:
   a first fixed seat having a plurality of grooves;
   a second fixed seat having a plurality of grooves;
   a first conductive device having a plurality of V-shaped scallops electrically connected each disposed in a corresponding groove of the first fixed seat;
   a second conductive device having a plurality of V-shaped scallops electrically connected each disposed in a corresponding groove of the second fixed seat;
   a plurality of lamps, disposed parallel to one another, each having a first end and a second end, wherein each first end is disposed in the corresponding V-shaped scallop of the first conductive device and each second end is disposed in the corresponding V-shaped scallop of the second conductive device;
   a third fixed seat disposed on the first end for fixing the lamps; and
   a fourth fixed seat disposed on the second end for fixing the lamps; wherein the surfaces of the third and fourth fixed seats are flat so that the lamps are fixed by triangle spaces formed by the V-shaped scallops and the flat surfaces of the third and fourth fixed seats.

7. The liquid crystal display device as claimed in claim 6, wherein depth and area of each V-shaped scallop both exceed a diameter of the lamp.

8. The liquid crystal display device as claimed in claim 6, further comprising:
   a first isolation layer, disposed between the first end of the lamp and the third fixed seat; and
   a second isolation layer, disposed between the second end of the lamp and the fourth fixed seat.

9. The liquid crystal display device as claimed in claim 8, further comprising:
   a third conductive device, disposed between the first end of the lamp and the first isolation layer; and
   a fourth conductive device, disposed between the second end of the lamp and the second isolation layer.

10. The liquid crystal display device as claimed in claim 6, further comprising a plurality of fixed devices, each having a V-shaped internal side and disposed between the groove of the first fixed seat and the V-shaped scallops of the first conductive device and between the grooves of the second fixed seat and the V-shaped scallops of the second conductive device, wherein each of the V-shaped scallops of the first and the second conductive devices conforms directly to each V-shaped internal side of the fixed device.

* * * * *